(12) United States Patent
Best et al.

(10) Patent No.: US 8,930,349 B2
(45) Date of Patent: Jan. 6, 2015

(54) SELECTIVELY MODIFYING SEARCH ENGINE RESULTS

(75) Inventors: Steven Francis Best, Georgetown, TX (US); Robert James Eggers, Jr., Austin, TX (US); Janice Marie Girouard, Austin, TX (US)

(73) Assignee: Internationl Business Machines Corporation, Armonk, NY (US)

( * ) Notice: Subject to any disclaimer, the term of this patent is extended or adjusted under 35 U.S.C. 154(b) by 2027 days.

(21) Appl. No.: 11/627,387

(22) Filed: Jan. 26, 2007

(65) Prior Publication Data
US 2008/0183670 A1 Jul. 31, 2008

(51) Int. Cl.
*G06F 17/30* (2006.01)
*G06F 7/00* (2006.01)

(52) U.S. Cl.
CPC .... *G06F 17/30887* (2013.01); *G06F 17/30867* (2013.01)
USPC .......................................... 707/723; 707/754

(58) Field of Classification Search
None
See application file for complete search history.

(56) References Cited

U.S. PATENT DOCUMENTS

| 6,324,552 | B1 | 11/2001 | Chang et al. | |
|---|---|---|---|---|
| 6,363,377 | B1 * | 3/2002 | Kravets et al. | 707/4 |
| 6,405,192 | B1 * | 6/2002 | Brown et al. | 707/3 |
| 6,476,833 | B1 | 11/2002 | Moshfeghi | |
| 6,510,461 | B1 * | 1/2003 | Nielsen | 709/224 |
| 6,631,496 | B1 | 10/2003 | Li et al. | |
| 6,751,777 | B2 | 6/2004 | Bates et al. | |
| 6,952,799 | B2 | 10/2005 | Edwards et al. | |
| 2002/0103914 | A1 * | 8/2002 | Dutta et al. | 709/229 |
| 2003/0110161 | A1 * | 6/2003 | Schneider | 707/3 |
| 2004/0205503 | A1 | 10/2004 | Gutta | |
| 2006/0075324 | A1 * | 4/2006 | Whitten et al. | 715/500 |

OTHER PUBLICATIONS

Okabe et al., "Interactive Web page Retrieval by Relational Learning based Filtering Rules", 2002, Active Mining—New Directions of Data Mining edited by Motoda, pp. 31-40.

* cited by examiner

Primary Examiner — Usmaan Saeed
Assistant Examiner — Yu Zhao
(74) Attorney, Agent, or Firm — Yee & Associates, P.C.; Steven L. Bennett

(57) ABSTRACT

A technique for enhancing and improving the usability of search engine search results that are presented to a user who has requested information using such search engine, by either eliminating, or alternatively distinguishing, web-page/web-site identifiers such as universal resource locators (URLs) from a search result list presented to the user when the web-page/web-site is not currently accessible by the user.

11 Claims, 5 Drawing Sheets

```
                                                            500
Web Results 1-6 of about 17,900. Search took 0.08 seconds   ↙

• LinuxHelp.net
     Includes new user guides, HOWTOs, and message forums.
     http://www.linuxhelp.net/ •13k • Nov 27,2006 •similar pages ○ LinuxHelp.net
          Logo Linux Help, DNS Hosting with easyDNS, guides, forums, blogs,
          Home Desktops
          Distributions ISO Images Logos Newbies Reviews Software Support ...

http://www.linuxhelp.net/linux downloads/ •23k •similar pages • [More
          results from www.linuxhelp.net]

• All about Linux
     Tips and tricks in using and administering Linux
     http://www.linuxhelp.blogspot.com/ •123k• Nov 27,2006 •similar pages ⎧ • LinuxHelp Australia-Homepage
502 ⎨   System setup and configuration, contract and emergency support
      ⎩   http://www.linuxhelp.com.au/ • 4k • similar pages

• Seeq--Search the Web for Information & Resources
     Seeq--Search the Web for Information & Resources.
     http://seeq.com/seeq/int index.jsp?portal id=2538&domain=seeq.com&
     referrer= •23k •similar pages

• LinuxHelp.com
     LinuxHelp.com. We're building an all new, improved LinuxHelp.com.
     Please check back soon. ©1997-2004 Curtis Dinkel.
     http://www.linuxhelp.com/ • 1k • similar pages ⎧ • LinuxHelp.IT
        Dedicato al software libero, a Linux ed al mondo Open Source, Vi si possono
504 ⎨   trovare recensioni/ su varie distribuzioni e programmi.
      ⎩ http://www.linuxhelp.it/ • 80k • Nov 28,2006 • similar pages
```

300

Web Results 1-6 of about 17,900. Search took 0.08 seconds.

- LinuxHelp.net
  Includes new user guides, HOWTOs, and message forums.

http://www.linuxhelp.net/ • 13k • Nov 27,2006 • similar pages o LinuxHelp.net
      Logo Linux Help, DNS Hosting with easyDNS, guides, forums, blogs, Home Desktops
      Distributions ISO Images Logos Newbies Reviews Software Support ...

http://www.linuxhelp.net/linux downloads/ • 23k • similar pages • [More results from www.linuxhelp.net]

- All about Linux
  Tips and tricks in using and administering Linux http://www.linuxhelp.blogspot.com/ • 123k • Nov 27,2006 • similar pages

- LinuxHelp Australia-Homepage
  System setup and configuration, contract and emergency support http://www.linuxhelp.com.au/ • 4k • similar pages

- Seeq--Search the Web for Information & Resources
  Seeq--Search the Web for information & Resources.

http://seeq.com/seeq/Int Index.isp?portal Id=253&domain=seeq.com&referrer= •25k• similar pages

- LinuxHelp.com
  LinuxHelp.com. We're building an all new, improved LinuxHelp.com.
  Please check back soon. ©1997-2004 Curtis Dinkel.

http://www.linuxhelp.com/ • 1k • similar pages

- LinuxHelp.IT
  Dedicato al software libero, a Linux ed al mondo Open Source, Vi si possono trovare recension/ su varie distribuzioni e programmi.

http://www.linuxhelp.it/ • 80k • Nov 28,2006 • similar pages

*FIG. 3*

400 

Web Results 1-4 of about 17,900.  Search took 0.08 seconds.

- LinuxHelp.net
  Includes new user guides, HOWTOs, and message forums.

http://www.linuxhelp.net/ • 13k • Nov 27,2006 • similar pages o LinuxHelp.net
      Logo Linux Help, DNS Hosting with easyDNS, guides, forums, blogs, Home Desktops
      Distributions ISO Images Logos Newbies Reviews Software Support ...

http://www.linuxhelp.net/linux downloads/ • 23k • similar pages • [More results from www.linuxhelp.net]

- All about Linux
  Tips and tricks in using and administering Linux http://www.linuxhelp.blogspot.com/ • 123k • Nov 27,2006 • similar pages

- Seeq--Search the Web for Information & Resources
  Seeq--Search the Web for information & Resources.

http://seeq.com/seeq/Int Index.isp?portal Id=253&domain=seeq.com&referrer=  •25k• similar pages

- LinuxHelp.com
  LinuxHelp.com.  We're building an all new, improved LinuxHelp.com.  Please check back soon. ©1997-2004 Curtis Dinkel.

http://www.linuxhelp.com/ • 1k • similar pages

*FIG. 4*

Web Results 1-6 of about 17,900.  Search took 0.08 seconds 500

- LinuxHelp.net
  Includes new user guides, HOWTOs, and message forums.

http://www.linuxhelp.net/ •13k • Nov 27,2006 •similar pages o LinuxHelp.net
      Logo Linux Help, DNS Hosting with easyDNS, guides, forums, blogs, Home Desktops
      Distributions ISO Images Logos Newbies Reviews Software Support ...

http://www.linuxhelp.net/linux downloads/ •23k •similar pages • [More results from www.linuxhelp.net]

- All about Linux
  Tips and tricks in using and administering Linux http://www.linuxhelp.blogspot.com/ •123k• Nov 27,2006 •similar pages

502 {
- LinuxHelp Australia-Homepage
  System setup and configuration, contract and emergency support
  http://www.linuxhelp.com.au/ • 4k • similar pages
}

- Seeq--Search the Web for Information & Resources
  Seeq--Search the Web for information & Resources.

http://seeq.com/seeq/Int Index.isp?portal Id=2538&domain=seeq.com& referrer=•23k•similar pages

- LinuxHelp.com

LinuxHelp.com. We're building an all new, improved LinuxHelp.com. Please check back soon. ©1997-2004 Curtis Dinkel.

http://www.linuxhelp.com/ • 1k • similar pages

504 {
- LinuxHelp.IT
  Dedicato al software libero, a Linux ed al mondo Open Source, Vi si possono trovare recension/ su varie distribuzioni e programmi.
  http://www.linuxhelp.it/ • 80k • Nov 28,2006 • similar pages
}

*FIG. 5*

SELECTIVELY MODIFYING SEARCH ENGINE RESULTS

BACKGROUND OF THE INVENTION

1. Field of the Invention

The present invention relates generally to data processing systems, and more particularly relates to techniques for manipulating results generated by a search engine used to access information by the data processing system. Still more particularly, the present invention relates to techniques for determining which results of a search engine are accessible by the data processing system.

2. Description of the Related Art

The Internet, also referred to as an "internetwork", is a set of computer networks, possibly dissimilar, joined together by means of gateways that handle data transfer and the conversion of messages from a protocol of the sending network to a protocol used by the receiving network. When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.). The information in various data files is formatted for presentation to a user by a standard page description language, the Hypertext Markup Language (HTML). In addition to basic presentation formatting, HTML allows developers to specify "links" to other Web resources identified by a Uniform Resource Locator (URL). A URL is a special syntax identifier defining a communications path to specific information. Each logical block of information accessible to a client, called a "page" or a "Web page", is identified by a URL. The URL provides a universal, consistent method for finding and accessing this information, not necessarily for the user, but mostly for the user's Web "browser". A browser is a program capable of submitting a request for information identified by an identifier, such as, for example, a URL. A user may enter a domain name through a graphical user interface (GUI) for the browser to access a source of content. The domain name is automatically converted to the Internet Protocol (IP) address by a domain name system (DNS), which is a service that translates the symbolic name entered by the user into an IP address by looking up the domain name in a database.

Due to the global and diverse nature of the Internet, it is sometimes difficult to find desired information that a user may desire to acquire or access. Search engines are useful in searching the Internet to obtain information pertaining to user-specified keywords that are entered by a user into the search engine to assist in obtaining desired information. A search engine or search service is a document retrieval system designed to assist a user in finding information maintained on various computer systems that comprise a network such as the World Wide Web or Internet. These search engines allow a user to specify desired information or content using keywords, phrases, or questions such that the search engine retrieves a list of items, typically URLs to computer systems which contain or relate to such items, or URLs that directly point to content maintained on such systems, which is to be retrieved as matching or otherwise relating to the user-specified search criteria. Known search engines such as Google and Yahoo provide such functionality.

However, in some situations, the particular computer system containing the requested information to be retrieved may not be available to the user, or the information may no longer exist at that location. For example, a common nuisance to many users is selecting a URL from a search result list and getting the infamous 'web site not found' error message. Other situations where this may occur are when various filters are used to block access to one or more web sites, including country censorship (e.g. countries such as China blocking access to western-country news media outlets, certain political/militant/religious organizations, etc.) and parental controls over website accessibility for their children. The problem is that today's search engines do not remove web sites that are otherwise inaccessible or blocked from their search results that are presented to the user.

Therefore, it would be advantageous to have an improved method, apparatus, and computer instructions for selectively removing search results such as web-pages/web-sites from a search result list when such web-page/web-site is not accessible.

SUMMARY OF THE INVENTION

The present invention is directed to a method, system, and program product for enhancing and improving the usability of search engine search results that are presented to a user who has requested information using such search engine, by either eliminating, or alternatively distinguishing, web-page/web-site identifiers such as universal resource locators (URLs) from a search result list presented to the user when the web-page/web-site is not currently accessible by the user. This advantageously allows for the user to only view sites/pages that they can access.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a traditional listing of search results from a search engine;

FIG. 4 is a listing of search results from a search engine where inaccessible web-sites or web-pages have been removed from the search results;

FIG. 5 is a listing of search results from a search engine where inaccessible web-sites or web-pages have been de-emphasized.

DETAILED DESCRIPTION OF THE PREFERRED EMBODIMENT

Figure 1:
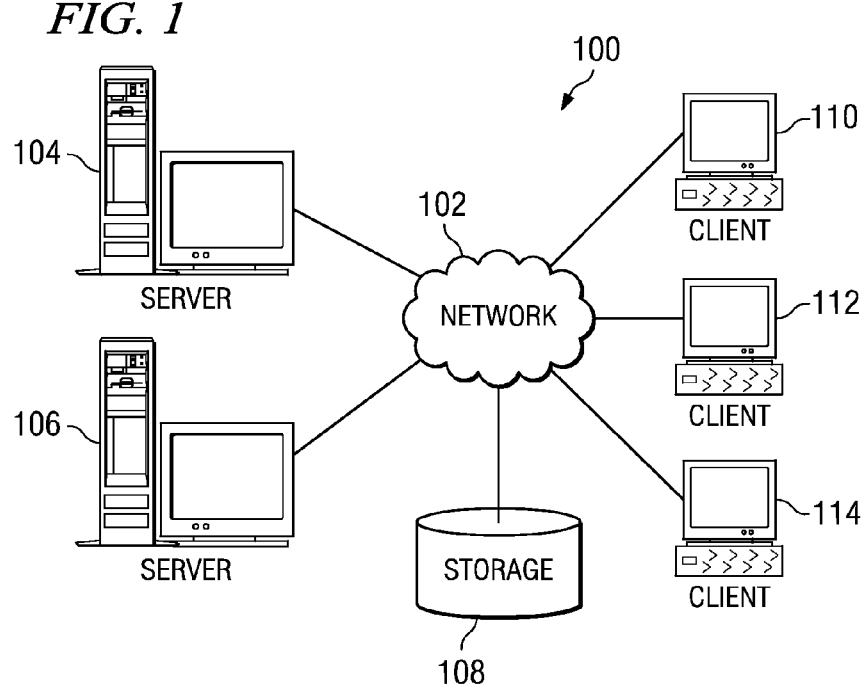
FIG. 1 is a network of data processing systems in which illustrative embodiments may be implemented.
Figure 2:
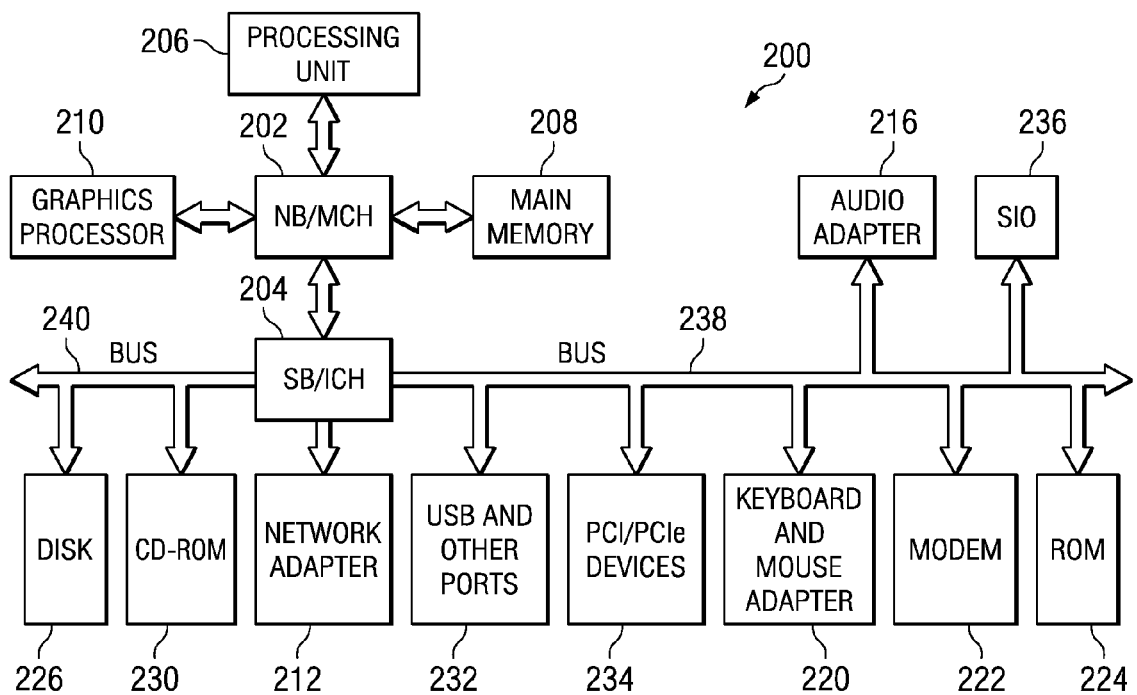
FIG. 2 is a block diagram of a data processing system in which illustrative embodiments may be implemented, such as a server or client computer system.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java and all Java-based trademarks are trademarks of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the illustrative embodiments may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The present invention is directed to a method, system, and program product for enhancing and improving the usability of search results that are returned by a search engine and presented to a user who has requested information using such search engine, by either eliminating, or alternatively distinguishing, web-page/web-site identifiers such as universal resource locators (URLs) from a search result list presented to the user when they are not currently accessible by the user. In a preferred embodiment, a web browser is used to filter search results obtained by a search engine to verify that the web-pages or web-sites identified in the search results are accessible to the user, before they are shown to a user. In an alternate embodiment, the web browser is used to differentiate between accessible and non-accessible web-pages or web-sites identified in the search results, such as presenting them in a different color, font, or grayed-out/de-emphasized in a non-selectable state.

Turning now to FIG. 3, there is shown a search engine's search results using a standard search engine and browser. As can be seen at 300, a list of various web-sites and web-pages is presented to a user on a display of a computing device, such as device 110 of FIG. 1. In this scenario, the search engine may execute on a server computer, such as server 104 or 106 of FIG. 1, and the web browser may execute on a client computer device, such as client 110, 112 or 114 of FIG. 1. In list 300, all web-sites and web-pages identified in the search result list are highlighted and can be selected by a user to attempt to access such web-site/web-page. However, as previously described, some of these web-sites and web-pages may not be accessible at the time the user invokes the search engine to retrieve these search results.

FIG. 4 shows a search engine's search results in accordance with a preferred embodiment of the present invention. As shown at 400, a list of web-sites and web-pages is listed, and is provided in list form by a search engine to a web browser for display to the user who initiated the web search. In this instance, however, certain of the web-sites returned by the search engine are not listed by the web browser, as the web browser has determined that the non-listed sites are currently not accessible to the user (such determination being further described below). For example, the LinuxHelp Australia Homepage and LinuxHelp.IT entries included in the search results 300 of FIG. 3 are not included or listed in the search results 400 of FIG. 4.

FIG. 5 shows a search engine's search results in accordance with an alternative embodiment of the present invention. As shown at 500, a list of web-sites and web-pages is listed, and is provided in list form by a search engine to a web browser for display to the user who initiated the web search. In this instance, however, certain of the web-sites returned by the search engine are listed in a grayed-out or de-emphasized, non-selectable form by the web browser, such as is shown at 502 and 504. These web sites may not be accessible due to their being associated with a country-specific domain name or URL such as .au or .it as dictated by a government-mandated censorship, parent-mandated restriction or other type of filtered/blocking mechanism.

In the following Table 1, there is depicted sample HTML code, usable with a standard web browser for controlling the visibility of table entries. This type of visibility control is used to selectively remove particular search results from a search result list provided to a web browser by a search engine.

TABLE 1

```
<SCRIPT>
function getSearch( ) {
    tblChoice1_1.style.visibility="visible";
    tblChoice2_1.style.visibility="visible";
    tblChoice3_1.style.visibility="hidden";
}
</SCRIPT>
:
<TABLE>
<TR>
    <TD>LItem1</TD><TD ID="tblChoice1_1">SearchEntry1</TD><TD>Available</TD>
</TR>
<TR>
    <TD>LItem2</TD><TD ID="tblChoice2_1">SearchEntry2</TD><TD>Available</TD>
</TR>
<TR>
    <TD>LItem3</TD><TDID="tblChoice3_1">SearchEntry3</TD><TD>NotAvailable</TD>
</TR>
</TABLE>
:
<INPUT TYPE=button onclick="getSearch( )" VALUE="Show Search Results">
```

Because tblChoice3_1.style.visibility has a 'hidden' parameter value associated with it, when this HTML script is invoked or executed, the third table entry (SearchEntry3) will not be listed or otherwise presented to the user, whereas the first two entries (SearchEntry1 and SearchEntry2) will be listed/presented to the user.

This visible/hidden parameter will be set to an appropriate value after determining if the URL associated with this particular entry (such as a table entry of a search result list returned by a search engine, as previously described) is available or reachable by the user's data processing system, such as client computer 110, 112 or 114 of FIG. 1. The following sample code, shown in Table 2, may be used to make such accessibility determination. While this example uses ActiveXObjects, other similar HTML mechanisms could also be used.

TABLE 2

```
var req = new ActiveXObject("Microsoft.XMLHTTP");
...
function processReqChange( ) {
    // only if req shows "loaded"
    if (req.readyState == 4) {
        // only if "OK"
        if (req.status == 200) {
            // ... normal processing statements go here ...
        } else {
            // ... set hidden property for table entry here ...
        }
    }
}
```

This code is used for each search result list entry returned by a search engine in order to determine if the web-site or web-page included in such search result is accessible. If not accessible, the hidden property for the associated table entry is set such that the particular search result table entry is not displayed to the user, as previously described with respect to Table 1.

Implementing the hidden option for the case where the url is now shown is as simple as:

TABLE 3

// set hidden property for table entry to invisible
req.Visible = false;

The above approach has the advantage of eliminating the need for the search engine itself to test the accessibility of any search results, instead moving the processing burden to the browser running on the user's client system.

Figure 6:
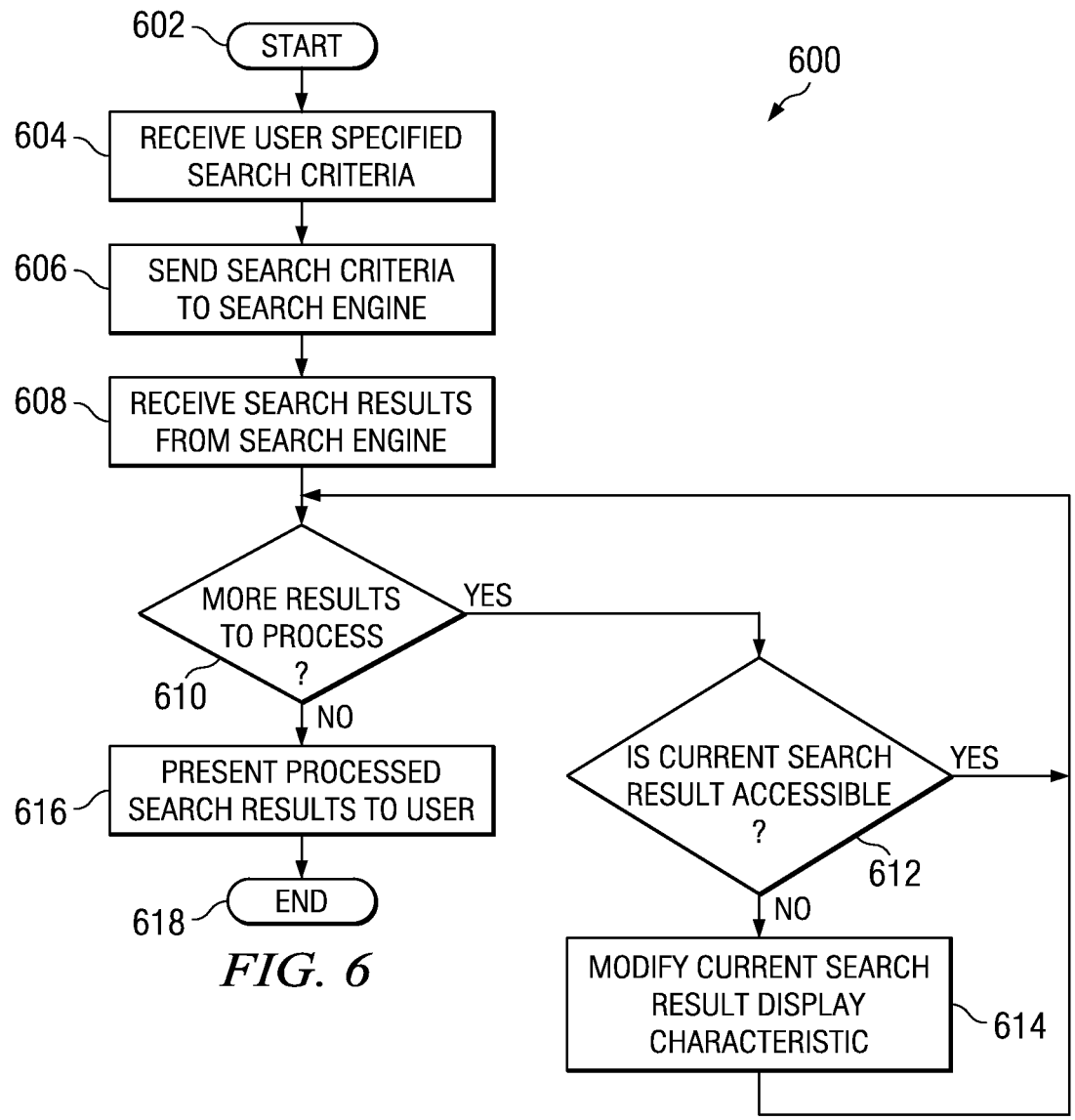
FIG. 6 is a flow diagram of a method used in a web browser to selectively modify display characteristics of entries in a search result generated by a search engine.

Turning now to FIG. 6, a processing methodology performed by a web browser executing on a client data processing system or computing device is shown at 600 for selectively modifying the display characteristics of entries in a search result generated by a search engine depending upon whether or not the individual web-sites or web-pages associated with each of the search results is accessible to the user using the user's data processing system or computing device. Processing begins at 602, and continues to 604 where user specified search criteria such as keywords, phrases or questions are input by the user and received by the web browser. A user would typically use a mouse and/or keyboard to provide input into a particular input field for capturing information to be forwarded to a search engine. For example, a user would provide such entry in a client computing device such as client 110, 112 or 114 of FIG. 1. This received search criteria is then sent by the web browser to a search engine at 606, which would typically be located on and executed by a different computing device, such as server computing device 104 or 106 of FIG. 1. The particular search engine for which this search criterion is sent is typically either a predefined or default search engine, or a particularly specified search engine as determined by the user when providing the search criterion to the web browser. The search results of the search engine are then received by the web browser at 608. Such search results, prior to post-processing by the web browser, may be of the form as shown in FIG. 3. The web browser then processes these search results, either prior to display of the search results to the user or concurrently with such display, depending upon the desired implementation as hereinafter described. A determination is made at 610 to determine if there are more results in the search result to be processed. If so, processing continues at 612 to determine whether a particular web-site or web-page referenced in this particular search result is accessible. For example, the process depicted above in Table 2 could be used to determine if the presently processed web-site/web-page is accessible to the user. If it is accessible, processing continues to 610 to continue processing with a next entry from the received search results. If the web-site/web-page is not accessible, processing continues to 614 where the display characteristics of the currently processed search result are modified. For example, the display characteristic could be set to 'hidden' as depicted above with respect to Table 1 such that the entry is not display when the post-processed search results are presented to the user. Returning back to block 610, if no more search results need to be processed, processing proceeds to 616 where the post-processed search results are presented to the user. Inaccessible or blocked links to web-sites or web-pages will either not be displayed, or displayed in a special fashion to the user, as previously described. The process then ends at 618.

The above described methods could be executed when the search result page is loaded, such that the display of such page is delayed while the accessibility processing of each entry has been completed. Alternatively, processing could be invoked and completed as the page is presented, where initially displayed links could disappear or otherwise change appearance (change colors, highlight, de-emphasize, etc) if it is subsequently determined that a particular entry in the search results is not currently accessible for this user. In this scenario (concurrent search result display and web-page/web-site accessibility determination), a status message and/or status bar indicating the processing status of the accessibility determination could be presented to the user, similar to what is shown on a display device by a web browser when a particularly large web page having lots of content is being loaded.

Thus, there has been described a technique for removing, or otherwise altering the display characteristics of, web-sites or web-pages returned in a search list by a search engine if such web-sites or web-pages are not currently accessible to the user requesting information from such search engine. This advantageously allows for the user to only view sites/pages that they can actually access, thereby removing inoperable links that otherwise clutter the search results—thus improving usability of the searching process and resulting display of search results. An additional benefit is that a country enacting government censorship is in a better position to do such censorship because their citizens do not know that they have been censored.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be (i) an electronic, magnetic, optical, electromagnetic, infrared, or semiconductor system (or apparatus or device) computer readable storage medium or (ii) a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for processing search engine search results by a browser executing on a client data processing system, comprising the steps of:
   receiving, by the browser executing on the client data processing system, a user-specified search criteria;
   sending, by the browser executing on the client data processing system, the user-specified search criteria to a search engine;
   receiving, by the browser executing on the client data processing system, search results from the search engine;
   determining, by the browser executing on the client data processing system in response to receiving the search results from the search engine, whether information included in the search results received from the search engine can be accessed by the client data processing system and if not, modifying a display characteristic for a portion of the search results pertaining to inaccessible information that cannot be accessed by the client data processing system, wherein the information comprises a plurality of entries, with each entry of the plurality of entries containing a location identifier for retrieving data associated with the each entry, wherein the display characteristic of a given entry that cannot be accessed by the client data processing system is modified such that the given entry is not displayed when the search results received from the search engine are presented to the user, wherein the display characteristic of a given entry that cannot be accessed by the client data processing system is set to a hidden value by a script executing on the client data processing system that also performs the determining step; and
   presenting, by the browser executing on the client data processing system, the search results to the user as modified by the browser.

2. The method of claim 1, wherein the step of determining whether information included in the search results can be accessed comprises determining whether the information no longer exists at a network location as specified by the plurality of entries.

3. The method of claim 1, wherein the location identifier is a uniform resource locator (URL), and the display characteristic that is conditionally modified pertains to how the URL is presented to the user based on whether the URL is reachable on a network by the client data processing system using an HTML ActiveXObject.

4. The method of claim 1, wherein the determining step is performed prior to the presenting step.

5. The method of claim 1, wherein the determining step is performed during the presenting step such that certain of the search results received from the search engine that are initially displayed are subsequently removed from being displayed for the inaccessible information which cannot be accessed by the client data processing system.

6. A system for processing search engine search results by a browser executing on client data processing system, comprising:
   means for receiving, by the browser executing on the client data processing system, a user-specified search criteria;
   means for sending, by the browser executing on the client data processing system, the user-specified search criteria to a search engine;
   means for receiving, by the browser executing on the client data processing system, search results from the search engine;
   means for determining, by the browser executing on the client data processing system in response to the means for receiving the search results from the search engine, whether information included in the search results received from the search engine can be accessed by the client data processing system and if not, modifying a display characteristic for a portion of the search results pertaining to inaccessible information that cannot be accessed by the client data processing system, wherein the information comprises a plurality of entries, with each entry of the plurality of entries containing a location identifier for retrieving data associated with the each entry, wherein the display characteristic of a given entry that cannot be accessed by the client data processing system is modified such that the given entry is not displayed when the search results received from the search engine are presented to the user, wherein the display characteristic of a given entry that cannot be accessed by the client data processing system is set to a hidden value by a script executing on the client data processing system that also performs the determining step; and
   means for presenting, by the browser executing on the client data processing system, the search results to the user as modified by the browser.

7. The system of claim 6, wherein the means for determining whether information included in the search results can be accessed comprises means for determining whether the information no longer exists at a network location as specified by the plurality of entries.

8. The system of claim 7, wherein the location identifier is a uniform resource locator (URL)), and the display characteristic that is conditionally modified pertains to how the URL is presented to the user based on whether the URL is reachable on a network by the client data processing system using an HTML ActiveXObject.

9. A computer program product embodied in a computer readable storage medium and having instructions operable by a client data processing system for processing search engine search results by a browser executing on the client data processing system, the computer program product comprising:
   first instructions for receiving a user-specified search criteria;
   second instructions for sending the user-specified search criteria to a search engine;
   third instructions for receiving search results from the search engine;
   fourth instructions for determining, responsive to receiving the search results from the search engine, whether information included in the search results received from the search engine can be accessed by the client data processing system and if not, modifying a display characteristic for a portion of the search results pertaining to inaccessible information that cannot be accessed by the client data processing system, wherein the information comprises a plurality of entries, with each entry of the plurality of entries containing a location identifier for retrieving data associated with the each entry, wherein the display characteristic of a given entry that cannot be accessed by the client data processing system is modified such that the given entry is not displayed when the search results received from the search engine are presented to the user, wherein the display characteristic of a given entry that cannot be accessed by the client data processing system is set to a hidden value by a script executing on the client data processing system that also performs the determining step; and fifth instructions for presenting the search results to the user as modified by the browser.

10. The computer program product of claim 9, wherein the fourth instructions for determining whether information included in the search results can be accessed comprises instructions for determining whether the information no longer exists at a network location as specified by the plurality of entries.

11. A data processing system for processing search engine search results, the data processing system comprising:

a bus system;

a memory connected to the bus system, wherein the memory includes a set of instructions;

a communications adapter connected to the bus system; and a processor connected to the bus system, wherein the processor executes the set of instructions to receive a user-specified search criteria, send the user-specified search criteria to a search engine, receive search results from the search engine, determine whether information included in the search results received from the search engine can be accessed by the client data processing system in response to receiving the search results from the search engine and if not, modify a display characteristic for a portion of the search results pertaining to inaccessible information that cannot be accessed by the data processing system, and present the search results as modified to the user, wherein the information comprises a plurality of entries, with each entry of the plurality of entries containing a location identifier for retrieving data associated with the each entry, wherein the display characteristic of a given entry that cannot be accessed by the client data processing system is modified such that the given entry is not displayed when the search results received from the search engine are presented to the user, wherein the display characteristic of a given entry that cannot be accessed by the client data processing system is set to a hidden value by a script executing on the client data processing system that also performs the determining step.

* * * * *